(No Model.)

F. HORA.
HORSE COLLAR FASTENING.

No. 426,501. Patented Apr. 29, 1890.

Witnesses:
M. P. Smith.
R. H. Orwig.

Inventor:
Frank Hora,
Thomas G. Orwig, Atty.

UNITED STATES PATENT OFFICE.

FRANK HORA, OF ODEBOLT, IOWA.

HORSE-COLLAR FASTENING.

SPECIFICATION forming part of Letters Patent No. 426,501, dated April 29, 1890.

Application filed November 22, 1889. Serial No. 331,253. (No model.)

*To all whom it may concern:*

Be it known that I, FRANK HORA, a citizen of the United States of America, and a resident of Odebolt, in the county of Sac and State of Iowa, have invented an Improved Metal Fastening Device for Horse-Collars, of which the following is a specification.

Heretofore a metal clip having a hook on its end has been fixed to the lower end of one part of a horse-collar to engage an eye on the end of a clip fixed to the mating part of the collar in such a manner that it required a vertical motion of the hook and the part of the collar to which it was fixed to fasten and unfasten the two lower ends of the collar.

My object is to provide mating clips, so that each clip will have a hook on its end so formed that the two hooks will reciprocally engage each other and move laterally in connecting and disconnecting the ends of the collar to which they are fixed.

My invention consists in the construction and combination of two clips with the abutting lower ends of a horse-collar, as hereinafter set forth, pointed out in my claim, and illustrated in the accompanying drawings, in which—

Figure 1:
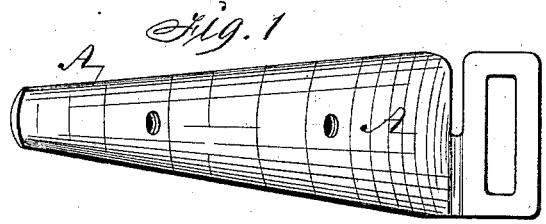
Figure 2:
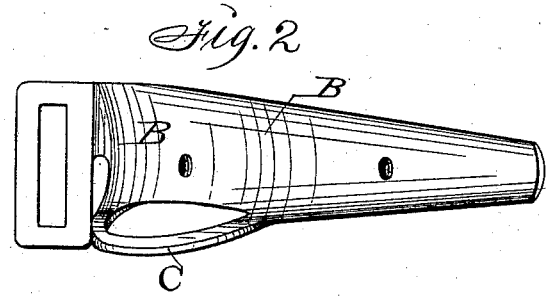
Figure 3:
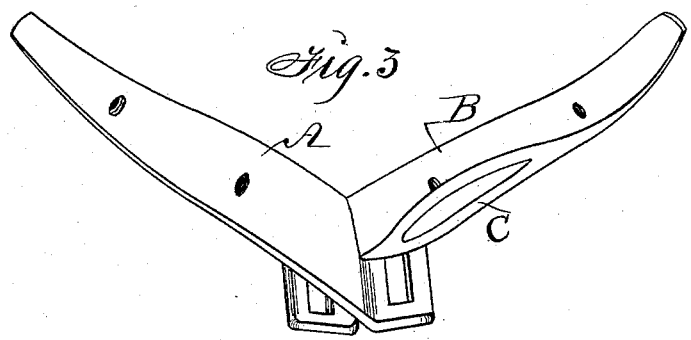
Figure 4:
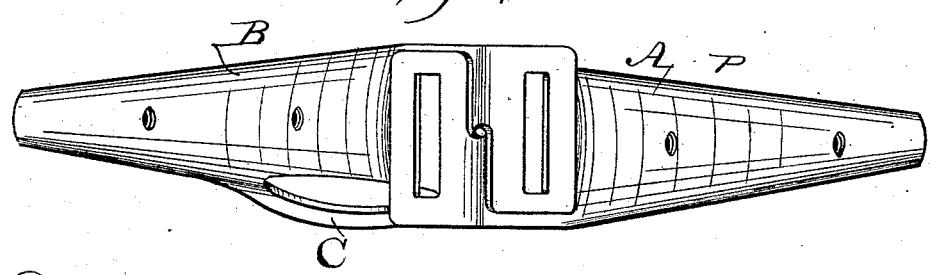

Figure 1 is an inside face view of one of the clips, and Fig. 2 is a corresponding view of the other mating clip. Fig. 3 is a perspective view showing the hooks reciprocally engaged as required to fasten the ends of a collar together. Fig. 4 is a bottom view of the same clips in a connected position.

A is a metal clip that tapers longitudinally and is concavo-convex in its cross-section and adapted to be fixed to the convex surface of the lower end of a horse-collar by means of screws or rivets in a common way. The broad end is bent upward at an angle of about forty degrees and partially severed by an open slot that extends from one end to the center, so as to produce a hook that projects laterally. B is a mating clip, of corresponding shape and size, that has a slot that produces a hook that projects laterally in the opposite direction from the hook on the clip A. Each hook has a slot in its center to produce a loop through which a strap can be readily passed and buckled together to prevent the hooks from lateral motion relative to each other, as required to keep them interlocked and the end of the collar connected on a horse.

C is an integral loop at the edge of the broad end of the clip B, adapted to receive a martingale or collar strap and to retain it connected with the collar when the collar is opened and removed from the horse.

I claim as my invention—

An improved fastener for horse-collars, consisting of two mating clips adapted in size and shape to be fixed to the lower mating ends of an open collar by means of screws or rivets, and the lower end of each clip terminating in a flat rectangular extension bent upward at an angle of about forty-five degrees, and provided with a transverse slot adapted to admit a leather strap, and an opening extending from one side of each extension to near the center to produce hooks that will reciprocally interlock by lateral motion of the ends of the collar, in the manner set forth, for the purposes stated.

FRANK HORA.

Witnesses:
S. H. NUNEMAKER,
WM. SAMPSON.